United States Patent
Park et al.

(10) Patent No.: US 11,297,528 B2
(45) Date of Patent: Apr. 5, 2022

(54) APPARATUS AND METHOD FOR CONTROLLING CONGESTION IN WIRELESS COMMUNICATION SYSTEM

(71) Applicant: Samsung Electronics Co., Ltd., Suwon-si (KR)

(72) Inventors: Sejin Park, Suwon-si (KR); Wonil Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 16/620,751

(22) PCT Filed: Jun. 1, 2018

(86) PCT No.: PCT/KR2018/006274
§ 371 (c)(1),
(2) Date: Dec. 9, 2019

(87) PCT Pub. No.: WO2018/225988
PCT Pub. Date: Dec. 13, 2018

(65) Prior Publication Data
US 2020/0145873 A1    May 7, 2020

(30) Foreign Application Priority Data
Jun. 9, 2017 (KR) .......................... 10-2017-0072584

(51) Int. Cl.
*H04W 28/02* (2009.01)
(52) U.S. Cl.
CPC ... *H04W 28/0289* (2013.01); *H04W 28/0231* (2013.01); *H04W 28/0284* (2013.01)
(58) Field of Classification Search
CPC ......... H04W 28/0289; H04W 28/0231; H04W 28/0284; H04L 47/11; H04L 47/26; H04L 47/30; H04L 29/08
See application file for complete search history.

(56) References Cited

U.S. PATENT DOCUMENTS

2003/0072310 A1* 4/2003 Reme ..................... H04L 47/14
370/394
2009/0147685 A1 6/2009 Malhotra
(Continued)

FOREIGN PATENT DOCUMENTS

| KR | 10-2010-0106381 A | 10/2010 |
| KR | 10-2014-0119530 A | 10/2014 |
| KR | 10-2017-0006234 A | 1/2017 |
| KR | 10-2017-0050361 A | 5/2017 |
| WO | 2014/163346 A1 | 10/2014 |

OTHER PUBLICATIONS

"Discussion on flow control over F1-U", ZTE, 3GPP TSG RAN WG3 Meeting #96, R3-171599 (May 15-19, 2017) (Year: 2017).*
(Continued)

*Primary Examiner* — Charles C Jiang
*Assistant Examiner* — Shawn D Miller
(74) *Attorney, Agent, or Firm* — Jefferson IP Law, LLP (57) ABSTRACT

The present disclosure relates to a 5G (5$^{th}$ generation) or pre-5G communication system for supporting a higher data transmission rate than a 4G (4$^{th}$ generation) communication system such as Long Term Evolution (LTE). In accordance with various embodiments of the present disclosure, a device in a Central Unit (CU) connected to a Distributed Unit (DU) and a fronthaul in a wireless communication system may comprise: a communication interface for performing signaling between the CU and the DU; and at least one processor for determining whether to control a congestion state of the DU on the basis of the signaling, and when controlling the congestion state of the DU, stopping transmission of at least one packet to the DU before processing a Packet Data Convergence Protocol (PDCP).

20 Claims, 8 Drawing Sheets (56) References Cited

U.S. PATENT DOCUMENTS

| | | | |
|---|---|---|---|
| 2013/0244659 A1* | 9/2013 | Murasawa | H04W 92/20 455/436 |
| 2014/0023015 A1 | 1/2014 | Frederiksen et al. | |
| 2016/0134540 A1* | 5/2016 | Ge | H04L 47/12 370/235 |
| 2020/0068652 A1* | 2/2020 | Xu | H04L 1/1642 |

OTHER PUBLICATIONS

"Flow Control in CU-DU Split Architecture", Altiostar Networks, Orange, 3GPP TSG RAN WG3 Meeting #96, R3-171820 (May 15-19, 2017) (Year: 2017).*
What is the 5G network structure that KT draws?—5T network structure analysis of KT, Oct. 28, 2015 <https://www.netmanias.com/ko/post/blog/8144/5g-c-ran-fronthaul-kt/analysis-of-kt-s-5g-network-architecture> See pp. 1-3; and figure 1.
Extended European Search Report dated Apr. 7, 2020, issued in a counterpart European Application No. 18813449.8-1215 / 3637706.
ZTE; "Discussion on flow control over F1-U" (D1); 3GPP TSG RAN WG3 Meeting #96; R3-171599; May 19, 2017, Hangzhou, P.R. China.
Altiostar Networks, Orange; "Flow Control in CU-DU Split . . . " (D2); 3GPP TSG RAN WG3 Meeting #96; R3-171820; May 19, 2017, Hangzhou, P.R. China.
European Office Action dated Jun. 21, 2021, issued in European Patent Application No. 18813449.8.
Korean Office Action dated Aug. 5, 2021, issued in Korean Patent Application No. 10-2017-0072584.

* cited by examiner

APPARATUS AND METHOD FOR CONTROLLING CONGESTION IN WIRELESS COMMUNICATION SYSTEM

CROSS-REFERENCE TO RELATED APPLICATION(S)

This application is a U.S. National Stage application under 35 U.S.C. § 371 of an International application number PCT/KR2018/006274, filed on Jun. 1, 2018, which is based on and claimed priority of a Korean patent application number 10-2017-0072584, filed on Jun. 9, 2017, in the Korean Intellectual Property Office, the disclosure of which is incorporated by reference herein in its entirety.

BACKGROUND ART

The disclosure relates generally to a wireless communication system and, more particularly, to an apparatus and a method for controlling congestion in a wireless communication system.

In order to meet wireless data traffic demands, which have increased since the commercialization of the 4th Generation (4G) communication system, efforts to develop an improved 5th Generation (5G) communication system or a pre-5G communication system have been made. For this reason, the 5G communication system or the pre-5G communication system is called a beyond 4G network communication system or a post Long-Term Evolution (LTE) system.

In order to achieve a high data transfer rate, an implementation of the 5G communication system in an ultra-high frequency (mmWave) band (e.g., 60 GHz band) is being considered. In the 5G communication system, technologies such as beamforming, massive Multi-Input Multi-Output (MIMO), Full Dimensional MIMO (FD-MIMO), array antenna, analog beamforming, and large-scale antenna are being discussed to mitigate propagation path loss in the ultra-high frequency band and increase a propagation transmission distance.

Further, technologies such as an evolved small cell, an advanced small cell, a cloud Radio Access Network (cloud RAN), an ultra-dense network, Device-to-Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as Hybrid Frequency Shift Keying and Quadrature Amplitude Modulation (FQAM) and Sliding Window Superposition Coding (SWSC), and advanced access technologies such as Filter Bank Multi-Carrier (FBMC), Non-Orthogonal Multiple Access (NOMA), and Sparse Code Multiple Access (SCMA).

In order to reduce an increase in a bandwidth in a fronthaul according to an increase in mobile data, a fronthaul function split between a Central Unit (CU) and a Distributed Unit (DU) may be applied to a 5G communication system. In this example, CUs and DUs may be connected to each other so as to have a many-to-many relationship therebetween, and thus congestion may occur in a DU to which traffic is provided by multiple CUs.

DISCLOSURE OF INVENTION

Technical Problem

On the basis of the discussion as described above, the disclosure provides an apparatus and a method for controlling congestion in a wireless communication system.

Also, the disclosure provides an apparatus and a method for increasing the stability (reliability) of traffic transmission/reception between a CU and a DU by controlling congestion in a wireless communication system.

Further, the disclosure provides an apparatus and a method for controlling congestion and ensuring reliability in various combinations of CUs and DUs according to function split-related function in a wireless communication system.

In accordance with an aspect of the disclosure, an apparatus of a Central Unit (CU) connected to a Distributed Unit (DU) through a fronthaul in a wireless communication system may include: a communication interface configured to perform signaling between the CU and the DU; and at least one processor configured to determine whether to control a congestion state of the DU, on the basis of the signaling, and when the congestion state of the DU is controlled, stop transmission of at least one packet to the DU before a Packet Data Convergence protocol (PDCP) processing.

In accordance with another aspect of the disclosure, an apparatus of a DU connected to a CU through a fronthaul in a wireless communication system may include: at least one processor; and a communication interface configured to transmit a message to the CU, and receive a packet from the CU, wherein the packet is a packet buffered by the CU or received from a core network after packet drop is performed by the CU, and whether to perform the buffering or the packet drop is determined before Packet Data Convergence Protocol (PDCP) processing by the CU.

An apparatus and a method according to various embodiments of the disclosure make it possible to control congestion and ensure reliability in a fronthaul through an interface between a CU and a DU.

Advantageous effects obtained in the disclosure are not limited to the above-mentioned effects, and other effects not mentioned above can be clearly understood from the following description by those having common knowledge in the technical field to which the disclosure pertains.

BEST MODE FOR CARRYING OUT THE INVENTION

The terms as used in the disclosure are merely used to describe particular embodiments and are not intended to limit the scope of other embodiments. A singular expression may include a plural expression unless the context clearly indicates otherwise. All terms used herein, including technical terms and scientific terms, have the same meanings as commonly understood by those having common knowledge in the technical field to which the disclosure pertains. Such terms as those defined in a generally-used dictionary among the terms as used in the disclosure are to be interpreted to have the meanings identical or similar to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

In various embodiments of the disclosure as described hereinafter, a hardware-based approach will be described as an example. However, various embodiments of the disclosure include technology that uses both hardware and software, and thus do not exclude a software-based approach.

Hereinafter, the disclosure relates to an apparatus and a method for controlling traffic congestion in a wireless communication system. Specifically, in the disclosure, a description will be made of technology for preventing occurrence of congestion in a fronthaul section or delivering a reliable packet despite the occurrence of congestion in the fronthaul section while function split is not affected in a fronthaul of a 5G wireless communication system.

The terms in the following description are used for convenience of description and illustrative purposes to refer to: data (e.g., traffic and packet); network entities (e.g., base station, 5G NB, CU, and DU); signaling (e.g., notification, message, and signal); elements of an apparatus; and the like. Accordingly, the disclosure is not limited to the following terms and other terms having equivalent technical meanings may be used.

Also, in the disclosure, various embodiments are described using the terms used in some communication standards (e.g., 3rd Generation Partnership Project (3GPP)), but this configuration is only an example for description. Various embodiments of the disclosure may also be easily modified and applied to another communication system. Further, in the disclosure, downlink is described as an example for convenience of description, but an apparatus and a method according to various embodiments may also be applied to uplink.

Wireless Environment and Fronthaul

Figure 1:
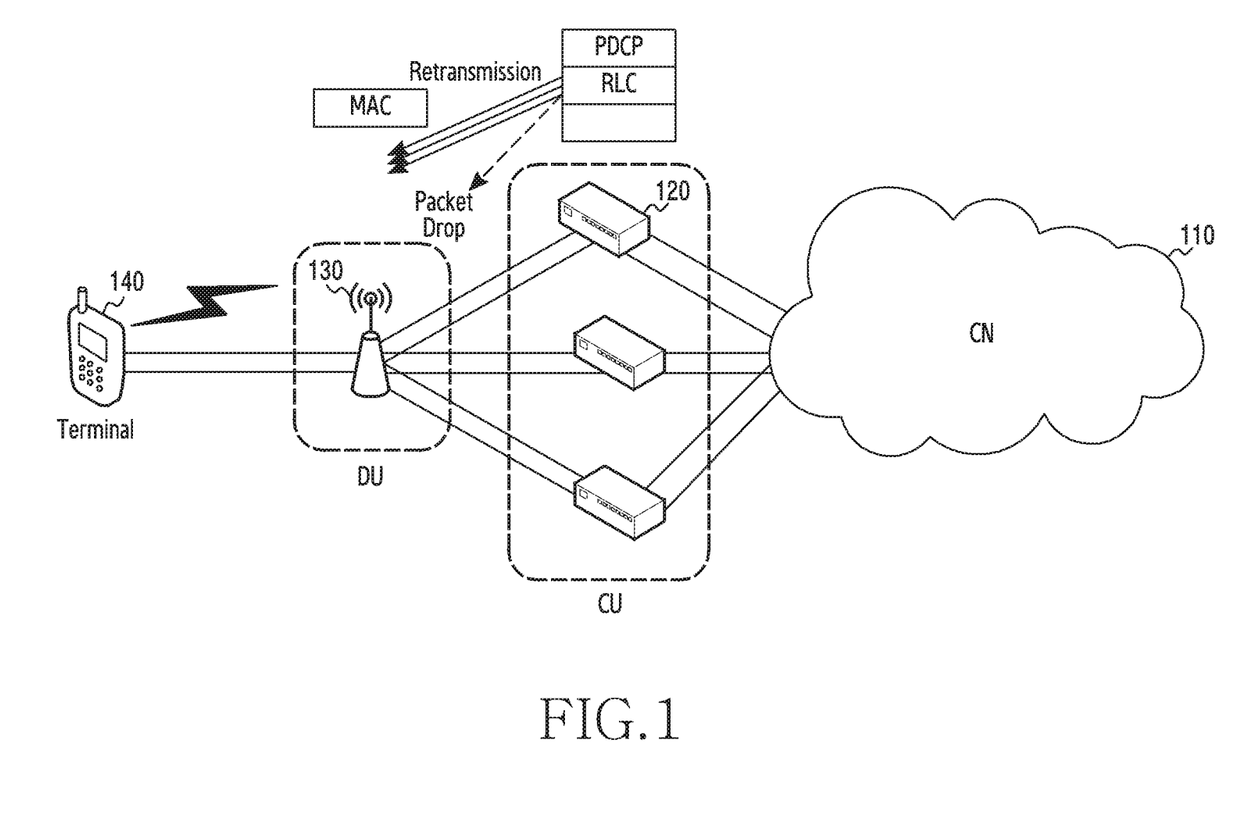
FIG. 1 illustrates a wireless communication system according to various embodiments of the disclosure.

FIG. 1 illustrates a wireless communication environment 100 according to various embodiments of the disclosure.

Referring to FIG. 1, the wireless communication environment 100 may include a Core Network (CN) 110, a Central Unit (CU) 120, a Distributed Unit (DU) 130, and a terminal 140.

The CN 110 may support communication of the terminal 140 through the CU 120 and the DU 130. For example, the CN 110 may perform authentication for the terminal 140, charging therefor, end-to-end connection management therefor, and the like. As another example, the CN 110 may allow various wireless access technologies to interwork with each other. The CN 110 may support communication of the terminal 140 in such a manner as to separate data and control information.

A base station is a network infrastructure which provides radio access to a terminal within a coverage. A coverage may be defined as a predetermined geographic area on the basis of the distance over which the base station can transmit a signal. The base station may include the CU 120 and the DU 130. The base station may be referred to as an "eNodeB (eNB)", a "5th generation node (5G node)", or a "5G NodeB (5G NB)".

In a conventional communication scheme, a base station is divided into a digital unit and a radio unit, as a Centralized/Cloud Radio Access Network (C-RAN). The digital unit performs functions of a Packet Data Convergence Protocol (PDCP), a Radio Link Control (RLC), a Media Access Control (MAC), and a Physical (PHY), and the radio unit performs only a Radio Frequency (RF) function. However, with the advancement of communication technology, mobile data traffic has increased, and accordingly, a bandwidth requirement amount required in a fronthaul between the digital unit and the radio unit has been greatly increased.

Hereinafter, in the disclosure, in order to reduce an increase in a bandwidth in a fronthaul, a situation to which a fronthaul function split is applied is on the premise. In this example, the fronthaul function split is a scheme in which functions of a PDCP, an RLC, a MAC, a PHY, and an RF are split up and configured for a CU and a DU. For example, the CU 120 may perform a PDCP function, and the DU 130 may perform an RLC function, a MAC function, a PHY function, and an RF function. As another example, the CU 120 may perform a PDCP function and an RLC function, and the DU 130 may perform a MAC function, a PHY function, and an RF function.

The CU 120 may provide a service to terminals (e.g., the terminal 140) within an area in a coverage which can be provided by DUs (e.g., the DU 130) connected to the CU 120. In some embodiments, the CU 120 may be implemented in software according to virtualization technology. The CU 120 may be referred to as a "cloud unit", a "Baseband Unit (BBU)", a "digital unit", or other terms having equivalent technical meanings.

The DU 130 may provide a service to terminals (e.g., the terminal 140) within an area in a coverage which can be provided by the DU 130. The DU 130 may be implemented in hardware and installed at a cell site in order to provide an access network to the terminal 140. In some embodiments, virtualization technology may be applied to some functions of the DU 130, as in the CU 120. The DU 130 may be referred to as an "Access Unit (AU)", an "Access Point (AP)", a "Transmission/Reception Point (TRP)", a "Remote Radio Head (RRH)", a "Radio unit (RU)", or other terms having equivalent technical meanings.

The terminal 140 is an apparatus used by a user, and communicates with the DU 130 through a wireless channel. In some cases, the terminal 140 may be operated without user involvement. For example, the terminal 140 is an apparatus that performs Machine-Type Communication (MTC), and may not be carried by a user. The terminal 140 may be referred to as a "User Equipment (UE)", a "mobile station", a "subscriber station", a "Customer Premises Equipment (CPE)", a "remote terminal", a "wireless terminal", an "electronic device", a "user device", or other terms having an equivalent technical meaning A terminal (e.g., the terminal 140) according to various embodiments of the disclosure may include at least one of, for example, a smart phone, a tablet PC, a mobile phone, a video telephone, an electronic book reader, a desktop PC, a laptop PC, a netbook computer, a workstation, a server, a Personal Data Assistant (PDA), a Portable Multimedia Player (PMP), an MP3 player, a medical device, a camera, or a wearable device.

FIG. 1 illustrates an example of a situation in which the one DU 130 is connected to three CUs including the CU 120 so as to perform signaling, but the disclosure is not limited thereto. For example, according to various embodiments, n (n is an integer) CUs and m (m is an integer) DUs may be connected to each other so as to perform signaling.

In the disclosure, a description will be made of an interface which may be applied to all of various combinations of CUs and DUs according to a fronthaul function split. An interface according to various embodiments of the disclosure may be applied to all possible cases in which functions that a CU and a DU take charge of are divided into: a PDCP function, and RLC, MAC, and PHY functions; PDCP and RLC functions, and MAC and PHY functions; or the like. Hereinafter, the interface may be referred to as a "fronthaul interface" or an "F-interface". Through an F-interface, a CU and a DU may exchange session information for processing of a packet. Further, through the interface, a CU and a DU may reduce a load, and thus may transmit or receive a large amount of data corresponding to a high bandwidth.

Hereinafter, in the disclosure, a method for controlling congestion will be described.

The CU 120 may transmit a relatively large number of packets to the DU 130. For example, the CU 120 may transmit downlink traffic, received from the CN 110, to the DU 130 without bandwidth limitation. As another example, when a load of a particular cell increases, the CU 120 may transmit, to the DU 130, burst retransmission traffic due to an RLC retransmission function together with downlink traffic received from the CN 110. When traffic of the DU 130 exceeds capacity as described above, a large number of packets may be discarded in a fronthaul interface or the DU 130 (hereinafter, "packet drop"), and thus the CU 120 may be required to adjust a bandwidth of downlink traffic so as to be suitable for a current situation of the DU 130 and a cell.

Meanwhile, in a base station supporting a 5G communication system, a CU may operate in a virtualization system, and thus may include Virtual Machines (VMs) related to multiple User Planes (UPs). As illustrated in FIG. 1, downlink traffic processed by multiple VMs may be processed by the one DU 130, and thus, even when the CU 130 individually performs flow control, there may occur a situation in which an amount of traffic received by the DU 130 exceeds the processing amount of the DU 130. Even in this case, a large number of packets may be discarded, and thus the DU 130 may be required to compare a situation, in which traffic is processed by the DU 130, with the amount of traffic which enters the DU 130 and transmit a notification for notifying of a congestion situation, to each CU (e.g., the CU 130) at a time point when occurrence of congestion is predicted and at a time point when it is necessary to control congestion.

Hereinafter, referring to FIG. 2, a description will be made of a protocol stack required to allow the CU 120 and the DU 130 to perform respective functions or required to perform signaling between the CU 120 and the DU 130.

Use of GTP-U and SCTP

Figure 2:
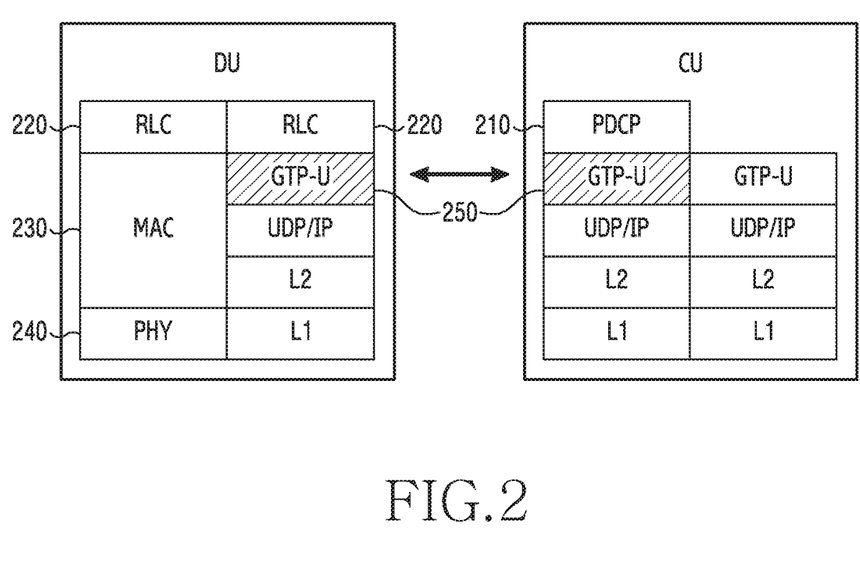
FIG. 2 illustrates an example of a protocol stack between a Central Unit (CU) and a Distributed Unit (DU) in a wireless communication system according to various embodiments of the disclosure.

FIG. 2 illustrates an example of a protocol stack between a CU and a DU in a wireless communication system according to various embodiments of the disclosure. The CU and the DU illustrated in FIG. 2 may be understood as the CU 120 and the DU 130 of FIG. 1. The protocol stack of FIG. 2 is a protocol stack of a user plane interface.

Referring to FIG. 2, a first layer (layer 1) L1 (e.g., Ethernet), a second layer (layer 2) L2 (e.g., Ethernet), and a User Datagram Protocol (UDP)/Internet Protocol (IP) layer may be used for signaling between a CN (e.g., the CN 110) and the CU and signaling between the CU and the DU. The CU may use a General packet radio service (GPRS) Tunneling Protocol-User plane (GTP-U) layer for signaling with the CN, reception of traffic from the CN, and reception of control information from the CN.

The CU may process a PDCP layer 210 according to function split. The DU may process an RLC layer 220, a MAC layer 230, and a PHY layer 240 except for the PDCP layer 210, according to a fronthaul function split. GTP-U 250 may be used as a protocol for an interface (an F-interface) between the CU and the DU. That is, the CU may perform GTP processing of downlink traffic received from the CN. The CU may perform a PDCP function on the traffic, the GTP processing of which has been performed. For example, the CU may deliver the traffic, that is, user data, or may perform header compression and ciphering. When the CU completes a role thereof according to function split (e.g., when the CP completes the execution of the PDCP function), the CU may generate a message, to which a GTP-U header is added, by using a Tunnel Endpoint Identifier (TEID) of the DU. In this example, the CU 120 may acquire the TEID of the DU when a call is established.

FIG. 2 illustrates a situation in which only a function of the PDCP layer is implemented by the CU according to function split between the CU and the DU, but the disclosure is not limited thereto. According to an embodiment, the CU may use the RLC layer 220.

Although not illustrated in FIG. 2, control signaling between the CU and the DU may be performed by a Stream Control Transmission Protocol (SCTP) layer. The SCTP layer provides message transmission, the reliability of which is ensured. In other words, for signaling between the CU and the DU, a GTP-U 250 layer is used in a user plane, and the SCTP layer is used in a Control Plane (CP).

Figure 3:
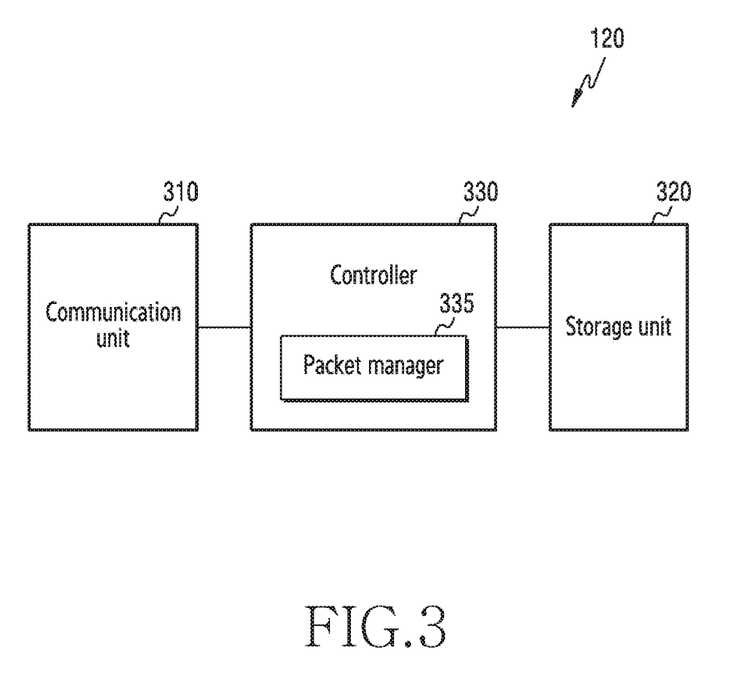
FIG. 3 illustrates a configuration of a CU in a wireless communication system according to various embodiments of the disclosure.
Figure 4:
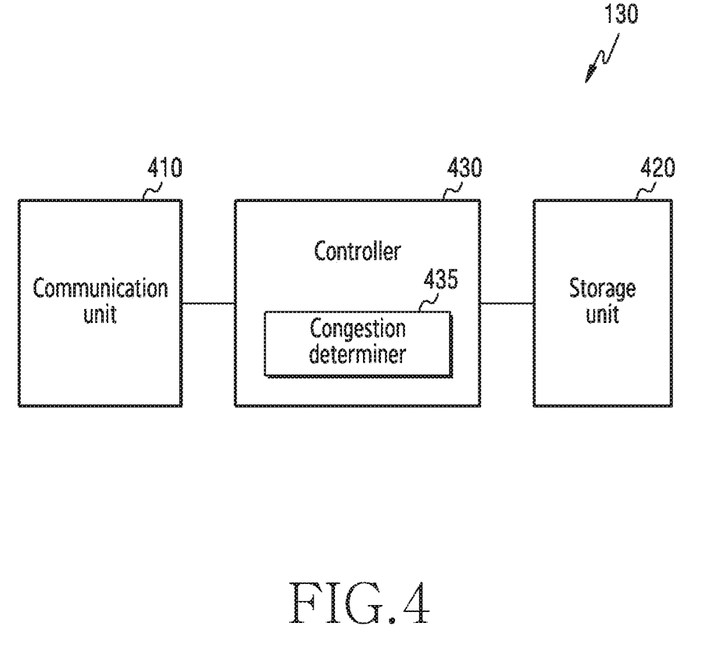
FIG. 4 illustrates a configuration of a DU in a wireless communication system according to various embodiments of the disclosure.

Hereinafter, FIG. 3 and FIG. 4 illustrate configurations of a CU and a DU configured to perform congestion control according to various embodiments of the disclosure, respectively.

FIG. 3 illustrates a configuration of a CU in a wireless communication system according to various embodiments of the disclosure. The configuration exemplified in FIG. 3 may be understood as the configuration of the CU 120. The term " . . . unit", the term ending with the suffix " . . . or" or " . . . er", or the like, which is used below, may refer to a unit of processing at least one function or operation, and this configuration may be implemented in hardware, software, or as a combination of hardware and software.

Referring to FIG. 3, the CU may include a communication unit 310, a storage unit 320, and a controller 330.

The communication unit 310 may perform functions of transmitting or receiving information. Specifically, the communication unit 310 may provide an interface configured to communicate with other nodes in a network. That is, the communication unit 310 is configured to convert, into a physical signal, a beat stream transmitted to another node, another CU connected to the CU, a DU connected to the CU through function split, or the like over a CN, and convert a physical signal, received from a base station, into a beat stream. According to embodiments of the disclosure, a communication interface provided through a fronthaul between the CU and the DU is an F-interface, and a GTP-U protocol may be used for the communication interface.

The communication unit 310 may be configured to perform functions of transmitting or receiving a signal in a wired communication environment. The communication unit 310 may include a wired interface configured to control a device-to-device direct connection through a transmission medium (e.g., a copper wire or an optical fiber). For example, the communication unit 310 may deliver an electrical signal to another node through a line made of a material having conductivity (e.g., copper), or may perform conversion between an electrical signal and an optical signal.

The communication unit 310 transmits and receives signals as described above. Accordingly, the communication unit 310 may be referred to as a "transmitter", a "receiver", or a "transceiver". Also, in the following description, transmission and reception has a meaning including the execution of the above-described processing by the communication unit 310.

The storage unit 320 may be configured to store data, such as a basic program for operation of the CU, an application program, and configuration information. The storage unit 320 may be implemented by a volatile memory, a non-volatile memory, or a combination of a volatile memory and a non-volatile memory. Also, the storage unit 320 is configured to provide stored data in response to a request of the controller 330. According to embodiments of the disclosure, the storage unit 320 may provide a buffer configured to store packets received from the CN. The storage unit 320 is configured to store packets in the buffer or discard the stored packets at a request of the controller 330.

The controller 330 is configured to control an overall operation of the CU. For example, the controller 330 is configured to transmit and receive signals through the communication unit 310. Also, the controller 330 is configured to record data in the storage unit 320 and read the recorded data therefrom. To this end, the controller 330 may include at least one processor. Functions according to embodiments of the disclosure may be performed by independent processors, respectively, or some of the functions may be performed by one processor.

The controller 330 may include a packet manager 335. The packet manager 335 may be configured to manage packets received from the CN through the communication unit 310. The packet manager 335 may be configured to determine whether to control congestion of a DU. When the congestion of the DU is controlled, the packet manager 335 may buffer the received packets (packet queueing) or may discard the same (packet drop). Further, for example, the controller 330 may control the CU to perform operations according to various embodiments described below.

FIG. 4 illustrates a configuration of a DU in a wireless communication system according to various embodiments of the disclosure. The configuration exemplified in FIG. 4 may be understood as the configuration of the DU 130. The term " . . . unit", the term ending with the suffix " . . . or" or " . . . er", or the like, which is used below, may refer to a unit of processing at least one function or operation, and this configuration may be implemented in hardware, software, or as a combination of hardware and software.

Referring to FIG. 4, the DU may include a communication unit 410, a storage unit 420, and a controller 430.

The communication unit 410 may be configured to perform functions of transmitting or receiving information. The communication unit 410 may provide an interface configured to communicate with a CU. The communication unit 410 may be configured to communicate with multiple CUs connected to the DU. As described above, according to embodiments of the disclosure, a GTP-U protocol may be used for an F-interface between the CU and the DU.

The communication unit 410 may be configured to perform functions of transmitting or receiving a signal in a wired communication environment in order to communicate with the CU. An interface, a protocol, and functions provided by the communication unit 310 of the CU in order to communicate with the DU may be similarly applied to the communication unit 410.

Meanwhile, the communication unit 410 may be configured to perform functions of transmitting or receiving a signal in a wireless communication environment. For example, the communication unit 410 may be configured to perform a function of conversion between a baseband signal and a bit stream according to a physical layer standard of the system. For example, the communication unit 410 may be configured to, when data is transmitted, generate complex symbols by encoding and modulating a transmission bit stream. Also, the communication unit 410 may be configured to, when data is received, reconstruct a reception bit stream by demodulating and decoding a baseband signal. Further, the communication unit 410 may be configured to up-convert a baseband signal into a Radio Frequency (RF) band signal and then transmit the RF band signal through an antenna, and may be configured to down-convert an RF band signal received through the antenna into a baseband signal. To this end, the communication unit 410 may include a transmission filter, a reception filter, an amplifier, a mixer, an oscillator, a Digital-to-Analog Converter (DAC), an Analog-to-Digital Converter (ADC), and the like. Also, the communication unit 410 may include multiple transmission/reception paths. According to an embodiment, the communication unit 410 may include a digital communication unit and an analog communication unit, and the analog communication unit may include multiple sub-units according to operating power, an operating frequency, and the like.

The storage unit 420 may be configured to store data, such as a basic program for operation of the DU, an application program, and configuration information. The storage unit 420 may be implemented by a volatile memory, a non-volatile memory, or a combination of a volatile memory and a non-volatile memory. Also, the storage unit 420 may be configured to provide stored data in response to a request of the controller 430. According to embodiments of the disclosure, the storage unit 420 may provide a buffer configured to store packets received from the CU. At a request of the controller 430, the storage unit 420 may configured to determine a state of packets stored in the buffer and provide the controller 430 with information on the state.

The controller 430 is configured to control an overall operation of the DU. For example, the controller 430 is configured to transmit and receive signals through the communication unit 410. Also, the controller 430 is configured to record data in the storage unit 420 and read the recorded data therefrom. To this end, the controller 430 may include at least one processor. Functions according to embodiments of the disclosure may be performed by independent processors, respectively, or some of the functions may be performed by one processor.

The controller 430 may include a congestion manager 435. The congestion manager 435 may be configured to manage congestion occurring in the DU through the communication unit 410. The congestion manager 435 may be configured to determine whether congestion occurs in the DU. Hereinafter, in the disclosure, whether congestion occurs may include whether congestion has already occurred and whether congestion is expected to occur. That is, the congestion manager 435 may be configured to determine whether congestion exists. The congestion manager 435 may be configured to determine the level of congestion. The congestion manager 435 may be configured to control the communication unit 410 to transmit a message to the CU in order to control congestion which has occurred or is predicted to occur. Further, for example, the controller 430 may control the DU to perform operations according to various embodiments described below.

Hereinafter, a method for controlling congestion in a DU will be described with reference to FIG. 5, and a method for estimating congestion in a DU and controlling the congestion by a CU will be described with reference to FIG. 6. That is, hereinafter, various embodiments relating to a congestion control operation and a congestion estimation operation will be described.

Congestion Control

Figure 5:
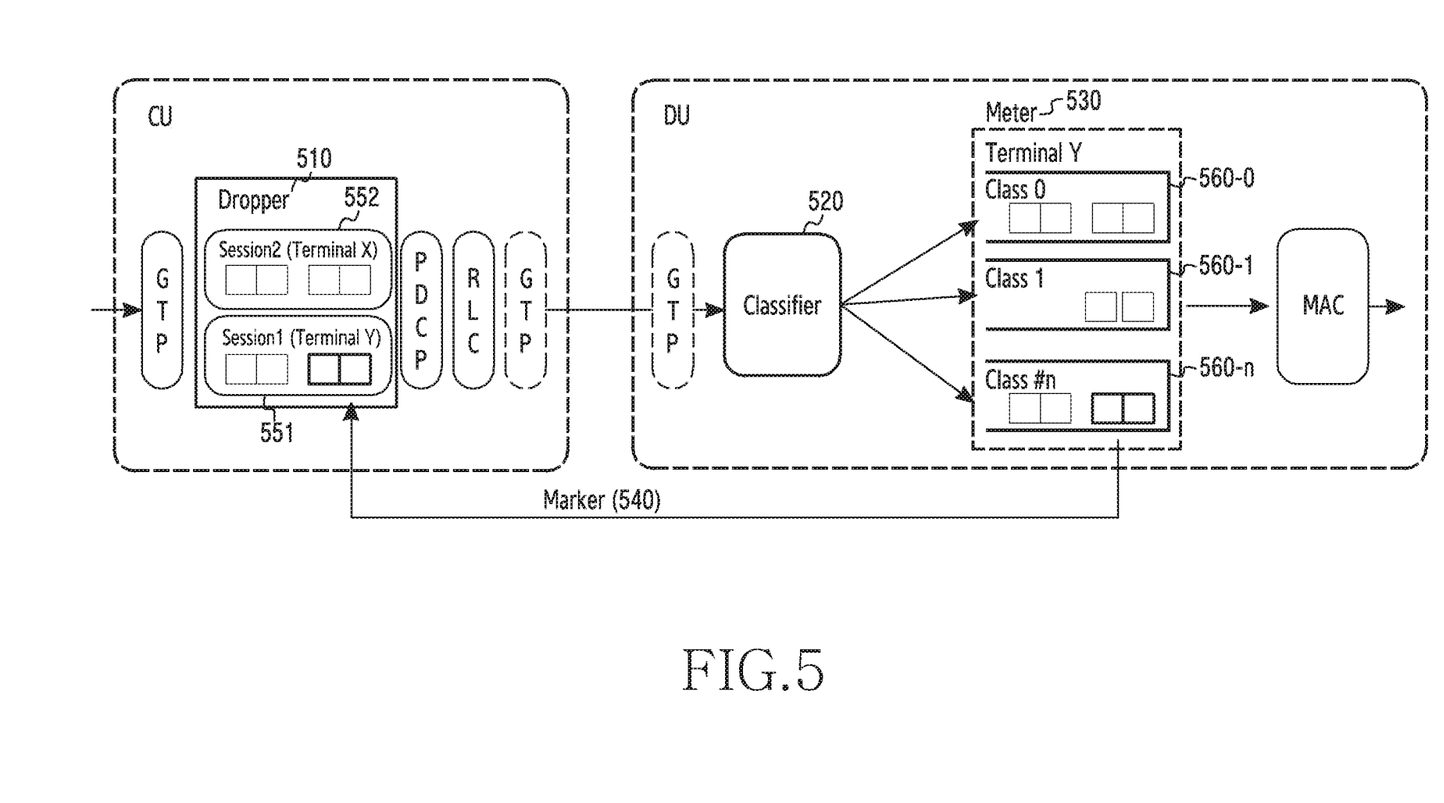
FIG. 5 illustrates an example of congestion control according to various embodiments of the disclosure.

FIG. 5 illustrates an example of congestion control according to various embodiments of the disclosure. FIG. 5 illustrates an example of structures of a CU and a DU by using functional elements necessary to perform congestion estimation and congestion control, and the CU and the DU illustrated in FIG. 5 may be understood as the CU 120 and the DU 130 of FIG. 1, respectively.

The CU may determine whether congestion has occurred in the DU, that is, whether to control congestion in the DU. The CU may verify a state of traffic (hereinafter, "congestion state") of the DU. Specifically, the CU may determine a congestion state for each session (terminal) located in the DU. Alternatively, the CU may determine a class-specific congestion state in the session. In some embodiments, the CU may estimate congestion in the DU. For example, the CU may determine a processing time in the DU through signaling with the DU, and may determine whether congestion occurs in the DU. In some other embodiments, the CU may receive, from the DU, a report on a current congestion state of the DU. For example, the DU may transmit, to the CU, whether congestion is predicted to occur, or the degree to which congestion is expected to occur. As another example, the DU may report a current state of a queue length to the CU. The CU may determine whether to perform congestion control, on the basis of a congestion state of the DU.

When the congestion control is determined to be performed, the CU may perform packet management at a time point of ingress of a packet from a CN. The CU may not deliver packets, received from the CN, to the DU or may deliver only some of the packets, received from the CN, to the DU. Hereinafter, for convenience of description, the packet management will be described as an operation of stopping packet transmission by the CU. In some embodiments, the CU may store a packet, received from the CN, in a buffer. Hereinafter, an operation of storing a packet, received from a CN, in a buffer will be referred to as "buffering" or "queueing". Subsequently, the CU may perform traffic shaping in which the size of a stored packet is adjusted and the stored packet having the adjusted size is transmitted to a DU. In some other embodiments, a CU may discard a packet received from a CN. Hereinafter, an operation of discarding a packet received from a CN will be referred to as "packet drop". Meanwhile, the CU may perform both buffering and packet drop. In other words, the CU may store a packet, received from the CN, in a buffer, and then may discard the packet when a predetermined period of time passes or the capacity of the buffer is exceeded.

Referring to FIG. 5, for congestion control according to various embodiments of the disclosure, functions of a dropper 510, a classifier 520, a meter 530, and a marker 540 may be added to the CU and the DU. Hereinafter, in the disclosure, a description will be made with reference to a configuration in which the CU includes the dropper 510 and the DU includes the classifier 520, the meter 530, and the marker 540, but the disclosure is not limited thereto. According to another embodiment, the classifier 520 may be included in the CU instead of the DU. In this example, the CU may provide information notifying of a classification result of data delivered to the DU.

According to various embodiments of the disclosure, the CU may determine whether to immediately transmit, to the DU, a packet received from the CN, or whether to stop delivery of a packet (buffering or packet drop) between a GTP and a PDCP (e.g., before PDCP processing). The CU may buffer or drop the downlink packet through the dropper 510 located before a PDCP function is performed.

Since a feedback structure in which the dropper 510 is performed before the meter 530 and the marker 540 described below on a downlink path is implemented, the CU may perform buffering or packet drop before processing of a PDCP layer (e.g., a time point of ingress of a packet from the CN). Since a packet is dropped or buffered before the processing of the PDCP layer, regardless of the configuration of a combination of protocols between the CU and the DU according to function split between the CU and the DU, congestion control may be performed without disturbing or damaging calculation in the PDCP layer and at least one layer below. For example, since the dropper 510 controls packet transmission before PDCP processing, the CU can prevent unnecessary PDCP resource allocation. The CU can prevent allocation of a Sequence Number (SN), and thus may operate according to a minimum procedure even when re-establishment or a handover subsequently occurs. Meanwhile, even when the CU includes an RLC, the CU can prevent unnecessary RLC resource allocation through the dropper 510, and may minimize RLC retransmission.

In some embodiments, since it is difficult to immediately remove a congestion situation when congestion occurs, the dropper 510 may drop a packet in an oldest-first manner when a particular period of time passes or transmission of a particular number of packets is stopped (buffered).

In some embodiments, in the case of an emergency packet which relatively needs emergency or has a higher importance level, the dropper 510 may transmit traffic to the DU regardless of traffic congestion in the DU. For example, the emergency packet may be a retransmission packet (e.g., an RLC retransmission packet). As another example, the emergency packet may be a Signaling Radio Bearer (SRB) packet. As described above, the dropper 510 may adaptively drop a packet by using an exception processing function.

When a designated period of time passes after a removal message indicating removal of congestion occurrence is received from the DU or a notification message notifying of congestion occurrence is received therefrom, the CU may resume processing of traffic. In this example, the term "resume" refers to resumption of the stopped transmission of downlink traffic when buffering of downlink traffic is performed, and implies that packet drop is no longer performed when packet drop of downlink traffic is performed.

The classifier 520 may determine whether traffic congestion is an object of monitoring, and may classify classes of terminals, according to a Quality of Service (QoS) value of each traffic. As an example, QoS may be a QoS Class Indicator (QCI). As another example, a QoS value may be an Allocation and Retention Priority (ARP). As still another example, the QoS value may be a Guaranteed Bit Rate (GBR). A QoS value may be selected by an operator's setting. The classifier 520 may employ a method, such as a Weighted Random Early Drop (WRED).

The meter 530 may measure a congestion state. Specifically, the meter 530 may measure congestion states according to the classified classes. The meter 530 may measure a bandwidth of a particular class, or may measure a burst level. As an example, the meter 530 may compare a profile of actually-entering traffic with a pre-agreed traffic profile so as to determine whether the profile of the actually-entering traffic exceeds the pre-agreed traffic profile. The meter 530 may deliver a measurement result to the marker 540.

The meter 530 may use a threshold for determination of whether congestion has occurred and whether occurrence of congestion has been removed. For example, the meter 530 may use a maximum value or a minimum value of a queue length, as the above-described threshold. In this example, a queue length may refer a traffic amount of a buffer for downlink transmission to a terminal connected to the DU. When a queue length exceeds the maximum value, the meter 530 may determine that congestion occurs. When a queue length is less than or equal to the minimum value, the meter 530 may determine that a congestion situation is removed. According to an embodiment, the thresholds (e.g., a maximum value and a minimum value) may be determined on the basis of a delay between the CU and the DU of a notification message described below. The meter 530 may determine whether congestion has occurred, on the basis of a threshold applied to a class for each priority. When a queue length approaches a threshold configured for each class, the meter 530 may notify the marker 540 of this situation.

The marker 540 may perform marking on the basis of the measurement result acquired from the meter 530. According to an embodiment, the marker 540 may distinguish among and mark three types, such as a normal state, a state in which congestion has not occurred but is expected to occur, and a state in which congestion has already occurred, as traffic states of the DU according to congestion states.

When congestion occurs, the DU may transmit a notification message notifying of a congestion situation, to the CU through control signaling. The DU may transmit a marking result of the marker 540 to the CU through a notification message. In this example, an SCTP layer is used to deliver the above-described message.

The DU may send a request for stopping transmission of a packet to a particular session (or particular QoS), to the CU through a notification message. In other words, the DU may request the CU for packet drop or queueing in relation to packets of the particular session. For example, the DU may configure Transmission (TX) OFF as an event in an SCTP message, and thus may request the CU to stop transmission of a packet.

In some embodiments, a notification message may include additional information in addition to stop of transmission of a packet. In this example, the additional information may include information indicating a degree representing a congestion state of the DU. For example, the DU may add a credit to an SCTP message, and thus may notify the CU of the degree of a congestion state.

In some embodiments, when multiple CUs transmit downlink traffic to one DU, the DU may transmit the above-described notification message only to some of the multiple CUs. For example, the DU may transmit the above-described notification message only to an N number of top-ranking CUs each having a larger ingress amount of traffic. N may be set by an operator of a DU, or may be adaptively determined by the DU, according to a congestion status of the DU. As another example, the DU may provide a notification only to at least one CU randomly selected from among multiple CUs.

After a notification message is transmitted to the CU, a congestion state of the DU may be relieved. When a queue length less than or equal to a threshold is detected as described above, the DU may determine that a congestion state of the DU is relieved. In order to improve traffic efficiency, the DU may request the CU to cancel stop of packet transmission. For example, the DU may configure TX ON as an event in an SCTP message, and thus may request the CU to cancel stop of packet transmission.

Differently from transmission of a notification message during occurrence of a particular event, the DU may periodically report a congestion state to the CU. In other words, the DU may periodically report a congestion state to the CU, regardless of a congestion state of traffic. A reporting cycle may be statically or adaptively configured according to an operator of a DU.

The CU having received a notification (or a report) from the DU may determine a congestion state of the DU. As described above, the CU may determine whether to perform congestion control, on the basis of the determined congestion state. When traffic in a DU session is congested and congestion control is performed, the CU may buffer or drop a downlink packet received from the CN. For example, the DU may determine that a class n is congested among a class 0 560-0, a class 1 560-1, . . . , and the class n 560-n of a terminal Y which is accessing the DU. The DU may mark the corresponding class n, and may transmit, to the CU, a message representing class n and a congestion degree. The CU may manage a session 551 and a session 552 for each terminal. For example, as illustrated in FIG. 5, the session 551 may be employed for a terminal X, and the session 552 may be employed for the terminal Y. A session may be referred to as a "bearer" or a "QoS session". The CU may identify a session (e.g., the session 522) corresponding to the DU having transmitted a message notifying of a congestion state. The CU may perform buffering or packet drop on packets in the identified session.

Meanwhile, the dropper 510, the classifier 520, the meter 530, and the marker 540 are functionally separated from one another so as to control traffic, and the separation is not limited to a configuration in which the constituent elements are necessarily implemented by separate hardware units. As an example, functions of the classifier 520, the meter 530, and the marker 540 may be performed by one processor located in the DU, or each of the functions may be performed by an independent processor.

Congestion Estimation

The CU may perform signaling with the DU in order to estimate congestion in the DU. As described with reference to FIG. 2, signaling between the CU and the DU may employ the GTP-U protocol. The CU may use a path management function of a GTP-U to determine the state of capacity of the DU. Hereinafter, a specific embodiment of signaling between a CU and a DU will be described with reference to FIG. 6.

Figure 6:
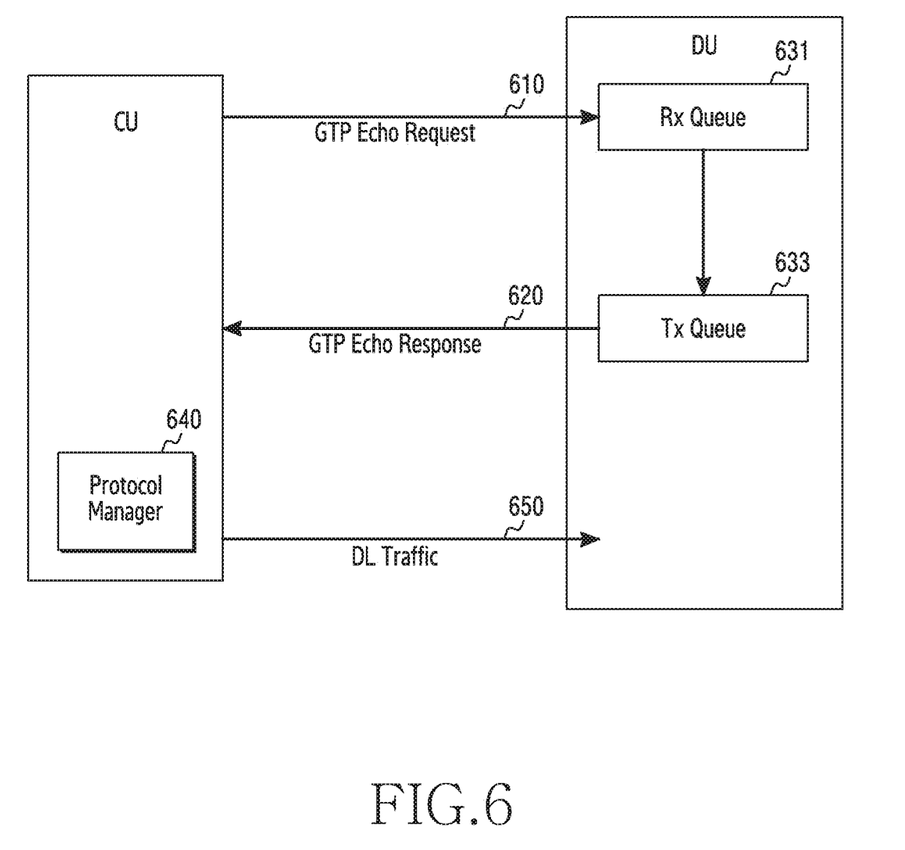
FIG. 6 illustrates an example of congestion estimation according to various embodiments of the disclosure.

FIG. 6 illustrates an example of congestion estimation according to various embodiments of the disclosure. The CU and the DU illustrated in FIG. 6 may be understood as the CU 120 and the DU 130 of FIG. 1.

Referring to FIG. 6, in operation 610, the CU may transmit a GTP echo request message to the DU. In some embodiments, the CU may periodically transmit a GTP echo request message to the DU. In some other embodiments, the CU may separately transmit a GTP echo request message when a particular event occurs.

In operation 620, the DU may transmit a GTP echo response message to the CU. When the CU receives a GTP echo response message from the DU, the CU may determine whether a corresponding path is valid (alive).

For congestion estimation, the CU may include an additional field (private extension) in a GTP echo request message to be transmitted to the DU. For round-trip time (RTT) measurement, the CU may include transmission time and a message delimiter when the CU transmits a GTP echo request message, in a private extension of the GTP echo request message, and may transmit the relevant GTP echo request message to the DU. The DU may include, in a private extension of a GTP echo response message, a reception time point (i.e., a time point at which the GTP echo request message enters a reception queue 631) at which the DU receives the GTP echo request message and a transmission time point (i.e., a time point at which the GTP echo response message is output from a transmission queue 633) at which the DU transmits the GTP echo response message, and may transmit the relevant GTP echo response message to the CU. The CU may calculate an RTT between the CU and the DU and a processing time of the DU by using the GTP echo request message and the GTP echo response message.

A field in a private extension may be defined in Table 1 below.

TABLE 1

| Field in private extension | Contents |
| --- | --- |
| Sender Timestamp | transmission time of request message on transmission side |
| Message Id | message delimiter |
| Reflector Rx Timestamp | reception time of request message on reception side |
| Reflector TX timestamp | transmission time of response message on reception side |

The CU may predict a congestion state of the DU at a particular time point through a change range of the measured RTT and a change range of the measured processing time of the DU. For example, when the CU periodically transmits a GTP echo request message to the DU, if each of the periodically-measured RTT and the periodically-measured processing time of the DU increases, the CU may determine that a probability of congestion occurrence in the DU increases.

In some embodiments, an additional field may be further included in the private extension defined in Table 1. For example, when the classifier of FIG. 5 is located in the CU, the CU may additionally insert identification information of a particular class into a private extension.

The CU can prevent control of congestion occurrence in the DU through control of a protocol manager 640. In this example, the protocol manager 640 may perform a function of the dropper 510 of FIG. 5. That is, the protocol manager 640 may queue or discard a packet received from a CN, according to the estimated congestion state of the DU.

Then, in operation 650, when a congestion state of the DU is relieved, or when congestion control is performed and then a predetermined period of time passes, the protocol manager may resume transmission of traffic to the DU.

Figure 7:
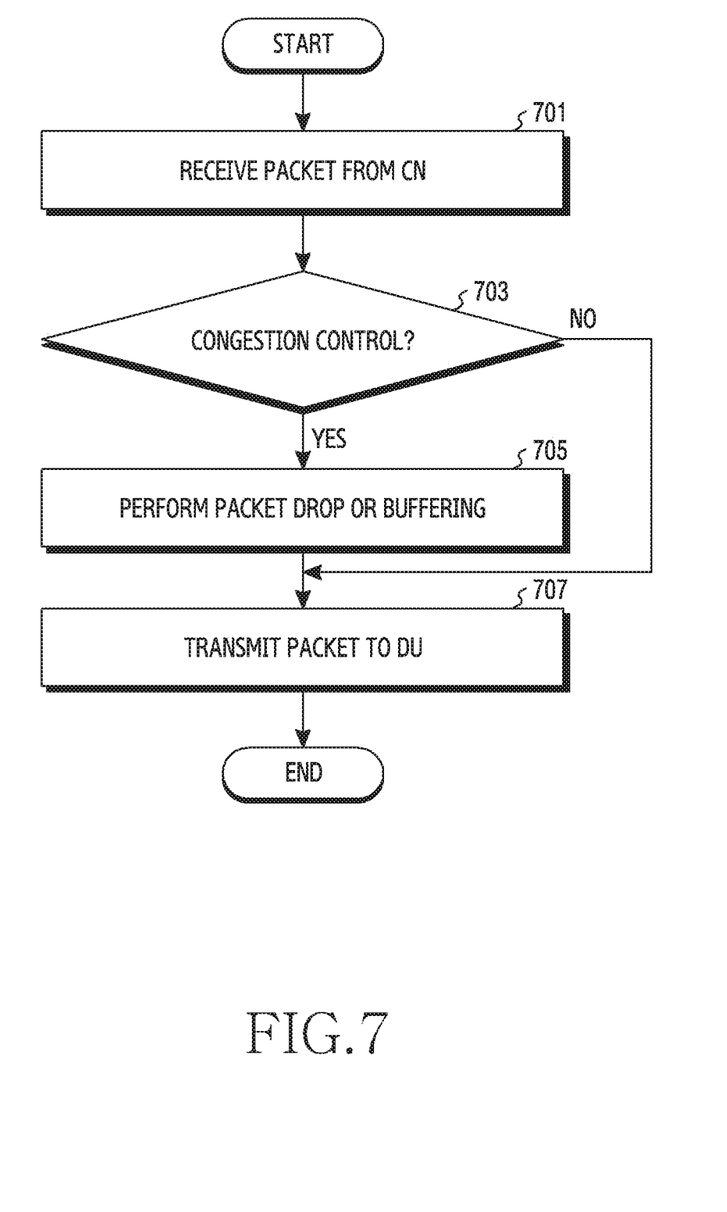
FIG. 7 illustrates a flowchart of a CU in a wireless communication system according to various embodiments of the disclosure.

FIG. 7 illustrates a flowchart of a CU in a wireless communication system according to various embodiments of the disclosure. FIG. 7 illustrates an example of an operating method of the CU 120.

Referring to FIG. 7, in operation 701, the CU may receive a packet from a CN. The CU may receive a packet through a GTP-U protocol from the CN. The CU may receive a packet through a session (or a bearer) established by a higher-layer node located in the CN.

In operation 703, the CU may determine whether to perform congestion control. The CU may estimate a congestion state of a DU through signaling with the DU, or may determine a congestion state of the DU by receiving information on the congestion state of the DU directly from the DU.

In some embodiments, the CU may transmit a GTP echo request message to the DU and receive a response message from a GTP echo, and thus may estimate a congestion state of the DU. Specifically, when each of an RTT change degree of the DU, an increase or decrease range of a processing time thereof, and the like is greater than or equal to a threshold, the CU may determine that the CU is to perform congestion control. In contrast, when the change degree or the increase or decrease range is less than the threshold, the CU may determine that the CU is not to perform congestion control. In some other embodiments, the CU may receive, from the DU, information indicating a congestion state of the DU, and the CU may determine a congestion state of the DU on the basis of the received information. For example, the CU may receive a result of marking performed by the DU, and may determine a congestion state of the DU on the basis of the result of the marking. As another example, the CU may receive a value of a queue length of the DU, and may determine a congestion state of the DU in consideration of a corresponding QoS threshold.

The CU may determine whether to perform congestion control according to the disclosure on the basis of the congestion state of the DU. When the CU is determined to perform congestion control, the CU proceeds to operation 705. In contrast, when the CU does not perform congestion control, the CU proceeds to operation 707.

When the CU is determined to perform congestion control, in operation 705, the CU may perform packet drop or buffering. That is, the congestion control includes buffering in which a packet, transmission of which has been stopped, is stored in a buffer, or packet drop in which a packet is discarded. According to an embodiment, before a packet received from the CN passes through PDCP processing, the CU may perform packet drop or buffering. For example, the CU may perform packet drop or buffering at a time point of ingress of a packet from the CN. The CU may discard a packet or store the same in a queue (a state in which discarding of a packet is predicted) before PDCP processing, that is, before resource allocation (e.g., SN assignment) for PDCP processing, making it possible to suppress unnecessary traffic in a fronthaul and ensure reliable transmission.

In operation 707, the CU may transmit a packet to the DU. In this example, a packet may correspond to downlink traffic. The CU may transmit downlink traffic to the DU through a GTP-U protocol on a user plane.

When the CU performs operation 705, the CU may retransmit a packet, transmission of which has been stopped, that is, a packet being stored in a buffer, to the DU, or may transmit, to the DU, the remaining packets except for a discarded packet. When the CU performs congestion control and then a predetermined period of time passes, or when the CU receives a separate control message from the DU, the CU may determine stop of the congestion control. The CU may resume transmission of a packet when the CU stops the congestion control. The CU may instantly transmit a processed packet to the DU so that functions assigned to the CU (e.g., SN assignment, compression, and encryption of a PDCP, also including RLC functions when the CU includes an RLC), and residual functions according to CU-DU function split can be performed by the DU.

Meanwhile, when the CU does not perform operation 705, that is, when congestion control is not performed, the CU may immediately deliver a packet, received from the CN, to the DU. The CU may process a packet through functions assigned to the CU, and may instantly transmit a processed packet to the DU so that residual functions according to CU-DU function split can be performed by the DU.

Figure 8:
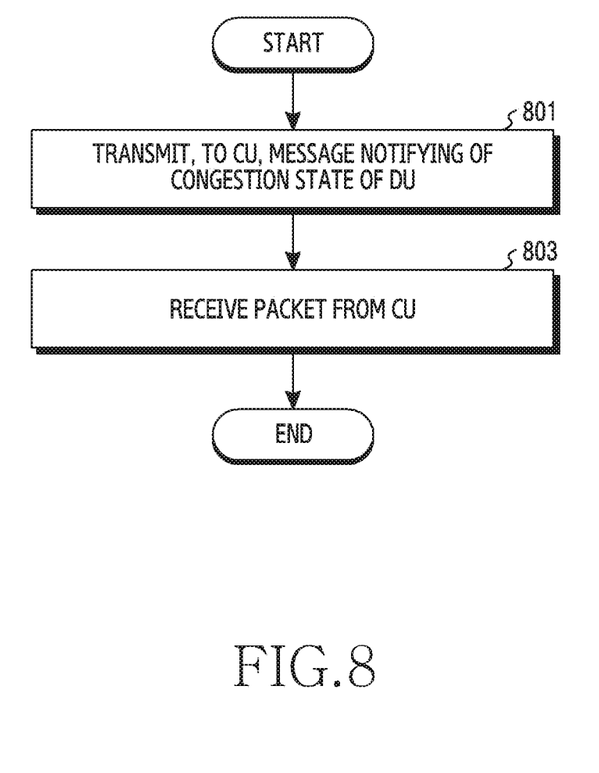
FIG. 8 illustrates a flowchart of a DU in a wireless communication system according to various embodiments of the disclosure.

FIG. 8 illustrates a flowchart of a DU in a wireless communication system according to various embodiments of the disclosure. FIG. 8 illustrates an example of an operating method of the DU 130.

Referring to FIG. 8, in operation 801, the DU may transmit, to a CU, a message notifying of a congestion state of the DU. The message may be control signaling using an SCTP protocol.

The DU may measure a congestion state of the DU. When a queue length of a terminal X exceeds a set maximum value, the DU may determine that a session of the terminal X is congested. The DU may notify the CU that a traffic session of the terminal X is congested, and may transmit, to the CU, a message requesting congestion control over the terminal X. When a queue length is less than a maximum value or exceeds a predetermined threshold and excess traffic is expected in the future, the DU may transmit, to the CU, a message notifying of the state of a current session. That is, in order to prevent congestion, the DU may transmit the message to the CU. For example, the message may be a message, a value of which is set to TX OFF which requests stop of transmission in an SCTP message.

Meanwhile, in some embodiments, when the CU is queueing packets that the CU should deliver to the DU, if a queue length becomes less than or equal to a threshold, the DU may transmit, to the CU, a message requesting the CU to remove a congestion situation. For example, the message may be a message, a value of which is set to TX ON in order to request resumption of transmission in an SCTP message.

Differently from the above description, the DU may regularly transmit a report message notifying of a congestion state of the DU. The report message may include information on a queue length of the DU or information indicating a congestion state determined according to a queue length.

In operation 803, the DU may receive a packet from the CU. According to whether the CU performs packet drop or buffering, the DU may immediately receive a packet delivered from a CN to the CU, may receive a packet stored in a buffer of the CU, or may receive packets delivered by the CN after a discarded packet. When the message transmitted in operation 801 is a message requesting stop of transmission, the DU may receive a packet after a predetermined period of time passes. In this example, the packet may be a packet stored in a buffer of the CU at a request for congestion control. Alternatively, the DU may receive a residual packet which has not been discarded during congestion control. When the message transmitted in operation 801 is a message requesting resumption of transmission, the DU may receive a packet stored in a buffer, or may immediately (without buffering) receive a packet delivered from the CN to the CU after resumption of transmission.

According to various embodiments of the disclosure, a fronthaul between a CU and a DU can be configured at minimum cost in order to process mobile data traffic. Further, such configuration of a fronthaul can provide flexible deployment of a CU and a DU, according to the operation of a 5G mobile system in the future.

A CU and a DU according to various embodiments of the disclosure enable session-specific traffic delivery between the CU and the DU, regardless of a combination of functions split between the CU and the DU, and make it possible to simply distinguish among sessions, terminals, and classes in the CU and the DU.

A CU (and a DU) according to various embodiments of the disclosure can optimize processing of a function of each protocol by queuing or dropping packets before PDCP processing by the CU, when a traffic congestion situation occurs in the DU. Also, when the CU includes an RLC, this configuration makes it possible to drop a packet before allocation of RLC resources, so as to prevent aggravation of a congestion situation due to RLC retransmission, thereby enabling more effective control of a congestion situation of the DU. Further, an acceptable value of the DU can be estimated in advance by using GTP-U signaling (e.g., GTP path management), and thus prevention and a rapid response can be achieved before occurrence of a congestion situation of the DU.

Methods according to claims of the disclosure or embodiments described in the specification thereof may be implemented in hardware, software, or as a combination of hardware and software.

When the methods are implemented in software, a computer-readable storage medium configured to store one or more programs (software modules) may be provided. The one or more programs stored in the computer-readable storage medium may be configured to be executable by one or more processors within an electronic device. The one or more programs may include instructions that cause the electronic device to perform the methods according to claims of the disclosure or embodiments described in the specification thereof.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), a Digital Versatile Disc (DVD), other type optical storage devices, or a magnetic cassette. Alternatively, the programs may be stored in a memory implemented by a combination of some or all of the above-described memories. Further, the electronic device may include a plurality of such memories.

Also, the programs may be stored in an attachable storage device which may access the electronic device through a communication network, such as the Internet, the Intranet, a Local Area Network (LAN), a Wide LAN (WLAN), or a Storage Area Network (SAN), or through a communication network implemented by a combination thereof. Such a storage device may access an apparatus configured to perform embodiments of the disclosure via an external port. Further, a separate storage device on the communication network may access an apparatus configured to perform embodiments of the disclosure.

In the above-described specific embodiments of the disclosure, an element included in the disclosure is expressed in a singular or plural form according to a presented specific embodiment. However, the singular or plural expression is appropriately selected according to the presented situation for convenience of description, and the disclosure is not limited to a single element or multiple elements thereof. An element expressed in the plural form may be configured as a single element, or an element expressed in the singular form may be configured as multiple elements.

While specific embodiments have been described in the detailed description of the disclosure, it goes without saying that various changes can be made within a limit without departing from the scope of the disclosure. Therefore, the scope of the disclosure should not be defined as being limited to the embodiments, but should be defined by the appended claims and equivalents thereof.

The invention claimed is:

1. A method performed by a central unit (CU) connected to a distributed unit (DU) through a fronthaul in a wireless communication system, the method comprising:
   identifying a congestion state of the DU based on a message from the DU; and
   based on identifying the congestion state of the DU, stopping transmission of at least one packet to the DU before packet data convergence protocol (PDCP) processing the at least one packet so that the at least one packet is not transmitted to the DU.

2. The method of claim 1, wherein the stopping of the transmission of the at least one packet comprises buffering or dropping the at least one packet.

3. The method of claim 2, wherein, when capacity of a buffer of the CU is exceeded, the stopping of the transmission of the at least one packet comprises dropping a packet in an order in packets are stored in the buffer.

4. The method of claim 1,
   wherein the identifying of the congestion state comprises identifying the congestion state of the DU, and
   wherein the CU performs PDCP processing and the DU performs radio link control (RLC) processing, medium access control (MAC) processing, and physical (PHY) processing.

5. The method of claim 4,
   wherein the identifying of the congestion state of the DU comprises:
   transmitting a request message to the DU; and
   receiving a response message from the DU,
   wherein the request message includes first time information indicating a time point at which the request message is transmitted, and
   wherein the response message includes second time information indicating a time point at which the DU receives the request message, and third time information indicating a time point at which the DU transmits the response message.

6. The method of claim 5, wherein the request message corresponds to a general packet radio service (GPRS) tunneling protocol (GTP) echo request message, and the response message corresponds to a GTP echo response message.

7. The method of claim 4,
   wherein the identifying of the congestion state of the DU comprises receiving a message notifying of the congestion state of the DU from the DU, and
   wherein the congestion state of the DU is identified based on a queue length of a terminal accessing the DU.

8. The method of claim 1, further comprising:
   when packet transmission is resumed, performing the PDCP processing on a packet, stored in a buffer of the CU, or a new packet; and
   transmitting the PDCP processed packet to the DU.

9. An apparatus of a central unit (CU) connected to a distributed unit (DU) through a fronthaul in a wireless communication system, the apparatus comprising:
   a communication interface configured to perform signaling between the CU and the DU; and
   at least one processor, wherein the at least one processor is configured to:
   identify a congestion state of the DU based on a message from the DU, and
   based on identifying the congestion state of the DU, stop transmission of at least one packet to the DU before packet data convergence protocol (PDCP) processing the at least one packet so that the at least one packet is not transmitted to the DU.

10. The apparatus of claim 9, wherein, to stop the transmission of the at least one packet to the DU before the PDCP processing, the at least one processor is further configured to buffer or drop the at least one packet.

11. The apparatus of claim 10, wherein, when capacity of a buffer of the CU is exceeded, the stopping of the transmission of the at least one packet comprises dropping a packet in an order in packets are stored in the buffer.

12. The apparatus of claim 11,
   wherein, to identify the congestion state, the at least one processor is further configured to identify the congestion state of the DU, and
   wherein the CU performs PDCP processing and the DU performs radio link control (RLC) processing, medium access control (MAC) processing, and physical (PHY) processing.

13. The apparatus of claim 12,
   wherein, to identify the congestion state of the DU, the at least one processor is further configured to:
   transmit a request message to the DU, and
   receive a response message from the DU,
   wherein the request message includes first time information indicating a time point at which the request message is transmitted, and
   wherein the response message includes second time information indicating a time point at which the DU receives the request message, and third time information indicating a time point at which the DU transmits the response message.

14. The apparatus of claim 13, wherein the request message corresponds to a general packet radio service (GPRS) tunneling protocol (GTP) echo request message, and the response message corresponds to a GTP echo response message.

15. The apparatus of claim 12,
   wherein, to identify the congestion state of the DU, the at least one processor is further configured to receive a message notifying of the congestion state of the DU from the DU, and
   wherein the congestion state of the DU is identified based on a queue length of a terminal accessing the DU.

16. The apparatus of claim 9, wherein the at least one processor is further configured to: when packet transmission is resumed, perform the PDCP processing on a packet, stored in a buffer of the CU, or a new packet, and
   transmit the PDCP processed packet to the DU.

17. An apparatus of a distributed unit (DU) connected to a central unit (CU) through a fronthaul in a wireless communication system, the apparatus comprising:
   a communication interface configured to perform signaling between the CU and the DU; and
   at least one processor, wherein the at least one processor is configured to:
  transmit, from the CU, a message which is used for the CU to identify a congestion state of the DU, and
  receive, from the CU, at least one packet of which transmission was previously stopped before packet data convergence protocol (PDCP) processing of the at least one packet by the CU,
wherein the at least one packet was previously not received from the CU.

18. The apparatus of claim 17,
wherein, in order to transmit the message, the at least one processor is further configured to:
  determine a congestion state of traffic with a terminal accessing the DU; and
  transmit, to the CU, the message including information indicating the congestion state, and
wherein the CU performs PDCP processing and the DU performs radio link control (RLC) processing, medium access control (MAC) processing, and physical (PHY) processing.

19. The apparatus of claim 18, wherein the message corresponds to a Stream Control Transmission Protocol (SCTP) message.

20. The apparatus of claim 17,
wherein the message corresponds to a message responding to a request message received from the CU,
wherein the request message includes first time information indicating a time point at which the request message is transmitted by the CU, and
wherein the message includes second time information indicating a time point at which the DU receives the request message, and third time information indicating a time point at which the DU transmits the message.

* * * * *